US008741212B2

(12) United States Patent
Aghajanian et al.

(10) Patent No.: US 8,741,212 B2
(45) Date of Patent: Jun. 3, 2014

(54) INTERMETALLIC-CONTAINING COMPOSITE BODIES, AND METHODS FOR MAKING SAME (76) Inventors: Michael K. Aghajanian, Newark, DE (US); Allyn L. McCormick, Lewes, DE (US); Michael S. Epperly, Bear, DE (US)

( * ) Notice: Subject to any disclaimer, the term of this patent is extended or adjusted under 35 U.S.C. 154(b) by 4 days.

(21) Appl. No.: 13/420,449

(22) Filed: Mar. 14, 2012

(65) Prior Publication Data
US 2012/0277087 A1 Nov. 1, 2012

Related U.S. Application Data (60) Continuation of application No. 12/215,221, filed on Jun. 25, 2008, now abandoned, which is a continuation-in-part of application No. 11/185,075, filed on Jul. 19, 2005, now Pat. No. 7,658,781, which is a continuation-in-part of application No. 10/336,626, filed on Jan. 3, 2003, now Pat. No. 6,919,127, which is a division of application No. 09/621,562, filed on Jul. 21, 2000, now Pat. No. 6,503,572.

(60) Provisional application No. 60/145,299, filed on Jul. 23, 1999.

(51) Int. Cl.
C04B 35/563 (2006.01)
C04B 35/565 (2006.01)
C04B 35/581 (2006.01)
C04B 35/584 (2006.01)

(52) U.S. Cl.
USPC .............. 264/682; 501/92; 501/94; 501/96.3; 501/96.1; 501/97.4; 501/98.6; 148/538

(58) Field of Classification Search
USPC ...................................................... 264/682
See application file for complete search history.

(56) References Cited

U.S. PATENT DOCUMENTS

| 3,205,043 | A | 9/1965 | Taylor |
|---|---|---|---|
| 3,246,275 | A | 4/1966 | Schrewelius |
| 3,275,722 | A | 9/1966 | Popper |
| 3,495,939 | A | 2/1970 | Forrest |
| 3,725,015 | A | 4/1973 | Weaver |
| 4,148,894 | A | 4/1979 | Hillig et al. |
| 4,174,971 | A | 11/1979 | Schrewelius |
| 4,600,481 | A | 7/1986 | Sane et al. |
| 4,735,923 | A | 4/1988 | Sugarowa et al. |
| 5,006,417 | A | 4/1991 | Jackson |
| 5,079,195 | A | 1/1992 | Chaing et al. |
| 5,125,822 | A | 6/1992 | Kasprzyk |
| 5,205,970 | A | 4/1993 | Brun et al. |
| 5,382,456 | A | 1/1995 | Hocking et al. |
| 5,464,583 | A | 11/1995 | Lessing |
| 5,509,555 | A | 4/1996 | Chaing et al. |
| 5,620,804 | A | 4/1997 | Kennedy et al. |
| 5,640,666 | A | 6/1997 | Jayashankar et al. |
| 5,840,221 | A | 11/1998 | Lau et al. |
| 5,865,922 | A | 2/1999 | Behrendt et al. |
| 5,945,166 | A | 8/1999 | Singh et al. |
| 6,245,424 | B1 | 6/2001 | Lau et al. |
| 6,447,852 | B1 | 9/2002 | Gordeev |
| 6,503,572 | B1 | 1/2003 | Waggoner et al. |
| 6,793,873 | B2 | 9/2004 | Gadow |
| 2003/0021901 | A1 | 1/2003 | Gasse |

FOREIGN PATENT DOCUMENTS

| DE | 197 11 831 A1 | 9/1998 |
|---|---|---|
| EP | 0 368 517 A | 5/1990 |
| EP | 0 372 708 A | 6/1990 |
| EP | 0 798 280 A2 | 10/1997 |
| JP | 04-238870 | 8/1992 |
| JP | 05-194033 | 8/1993 |
| JP | 2005-104752 | 4/2005 |

OTHER PUBLICATIONS

J.S. Haggerty and Y.-M. Chaing, "Reaction-Based Processing Methods for Ceramics and Composites", *Ceram. Eng. Sci. Proc.*, 11[7-8] pp. 757 and 760-781 (1990).

Leszek Hozer et al,, "Reactive-infiltration processing of SiC-metal and SiC-intermetallic composites", *Journal of Materials Research*, vol. 11, No. 9, Sep. 1996, pp. 2346-2357.

Leszek Hozer et al., "Phase Composition Control in SiC Composites Prepared by Reactive-Infiltration with Metal-Silicon Alloys", in Advanced Synthesis and Processing of Composites and Advanced Ceramics, *Ceramic Trans.*, v56, American Ceramic Society, Inc., 1995, pp. 157-165.

A.J. Whitehead and T.F. Page, "Fabrication and characterization of some novel reaction-bonded silicon carbide materials", *J. Mat. Sci.*, Feb. 1, 1992, pp. 839-852, v.27, No. 3, Chapman and Hall, London, GB.

*Primary Examiner* — George Wyszomierski
*Assistant Examiner* — Ngoclan T Mai
(74) *Attorney, Agent, or Firm* — Law Office of Jeffrey R. Ramberg (57) ABSTRACT

Composite bodies made by a silicon metal infiltration process that feature a silicon intermetallic, e.g., a metal silicide. Not only does this give the composite material engineer greater flexibility in designing or tailoring the physical properties of the resulting composite material, but the infiltrant also can be engineered compositionally to have much diminished amounts of expansion upon solidification, thereby enhancing net-shape-making capabilities. These and other consequences of engineering the metal component of composite bodies made by silicon infiltration permit the fabrication of large structures of complex shape.

18 Claims, 6 Drawing Sheets

INTERMETALLIC-CONTAINING COMPOSITE BODIES, AND METHODS FOR MAKING SAME

CROSS-REFERENCE TO RELATED APPLICATIONS

This patent document is a Continuation of U.S. patent application Ser. No. 12/215,221, filed on Jun. 25, 2008, now abandoned which is a Continuation-in-Part of U.S. patent application Ser. No. 11/185,075, filed on Jul. 19, 2005, now U.S. Pat. No. 7,658,781 which was a Continuation-in-Part of U.S. patent application Ser. No. 10/336,626, filed on Jan. 3, 2003 (now U.S. Pat. No. 6,919.127), which was a Divisional of U.S. patent application Ser. No. 09/621,562, filed on Jul. 21, 2000, now U.S. Pat. No. 6,503,572, which claimed the benefit of U.S. Provisional Patent Application No. 60/145,299, filed on Jul. 23, 1999. Application Ser. No. 12/215,221 also is a Continuation of international patent application PCT/US2007/004797, which claims the benefit of U.S. Provisional Patent Application No. 60/776,977, filed on Feb. 24, 2006. The entire contents of each of these commonly owned patent applications is incorporated herein by reference.

FIELD OF THE INVENTION

The present invention relates to improved composite materials and the melt infiltration methods for producing the same. Specifically, the present invention relates to intermetallic-containing composites wherein the molten infiltrant contains silicon plus one or more metallic constituents other than the silicon. In a preferred embodiment, the intermetallic composite also contains silicon carbide, at least a portion of which is produced by reactive infiltration.

BACKGROUND OF THE INVENTION

Silicon carbide (SiC) composites have been produced by reactive infiltration techniques for decades. In general, such a reactive infiltration process entails contacting molten silicon (Si) with a porous mass containing silicon carbide plus carbon in a vacuum or an inert atmosphere environment. A wetting condition is created, with the result that the molten silicon is pulled by capillary action into the mass, where it reacts with the carbon to form additional silicon carbide. This in-situ silicon carbide typically is interconnected. A dense body usually is desired, so the process typically occurs in the presence of excess silicon. The resulting composite body thus contains primarily silicon carbide, but also some unreacted silicon (which also is interconnected), and may be referred to in shorthand notation as Si/SiC. The process used to produce such composite bodies is interchangeably referred to as "reaction forming", "reaction bonding", "reactive infiltration" or "self bonding".

Reaction bonded silicon carbide (sometimes referred to in shorthand notation as "RBSC") ceramics combine the advantageous properties of high performance traditional ceramics, with the cost effectiveness of net shape processing. Reaction bonded silicon carbide ceramic offers extremely high levels of mechanical and thermal stability. It possesses high hardness, low density (similar to Al alloys) and very high stiffness (~70% greater than steel). These properties lead to components that show little deflection under load, allow small distances to be precisely controlled with fast machine motion, and do not possess unwanted low frequency resonant vibrations. In addition, due to the high stiffness and hardness of the material, components can be ground and lapped to meet stringent flatness requirements. Moreover, as a result of very low coefficient of thermal expansion (CTE) and high thermal conductivity, RBSC components show little distortion or displacement with temperature changes, and are resistant to distortion if localized heating occurs. Furthermore, both Si and SiC possess refractory properties, which yields a composite with good performance in many high temperature and thermal shock applications. Finally, dense, high purity SiC coatings can be applied when extremely high purity and/or superior resistance to corrosion are required.

In one of the earlier demonstrations of this technology, Popper (U.S. Pat. No. 3,275,722) produced a self-bonded silicon carbide body by infiltrating silicon into a porous mass of silicon carbide particulates and powdered graphite in vacuo at a temperature in the range of 1800 to 2300° C.

Taylor (U.S. Pat. No. 3,205,043) also produced dense silicon carbide bodies by reactively infiltrating silicon into a porous body containing silicon carbide and free carbon. Unlike Popper, Taylor first made a preform consisting essentially of granular silicon carbide, and then he introduced a controlled amount of carbon into the shaped mass. In one embodiment of his invention, Taylor added the carbon in the form of a carbonizable resin, and then heated the mass containing the silicon carbide and infiltrated resin to decompose (carbonize) the resin. The shaped mass was then heated to a temperature of at least 2000° C. in the presence of silicon to cause the silicon to enter the pores of the shaped mass and react with the introduced carbon to form silicon carbide.

U.S. Pat. No. 4,174,971 to N. G. Schrewelius, entitled "Silicon Carbide Body Containing a Molybdenum Disilicide Alloy", featured SiC plus carbon preforms being infiltrated with molten Mo—Si alloy instead of pure Si. Upon cooling, $MoSi_2$ formed as the second phase. Note that due to the high melting point of Si—Mo alloys, the infiltration temperature used was very high at 2150° C.

In spite of the many outstanding properties, including high specific stiffness, low coefficient of thermal expansion, and high thermal conductivity enumerated above, reaction bonded SiC ceramics generally have low fracture toughness, and therefore may not be optimal in applications where impact loading will occur.

In response, materials investigators have experimented with various techniques for enhancing the toughness or impact resistance of such inherently brittle ceramic-rich materials. Perhaps the most popular approach has been to incorporate fibrous reinforcements and attempt to achieve crack deflection or fiber debonding and pull-out mechanisms during the crack propagation process.

Hillig and his colleagues at the General Electric Company, motivated in part by a desire to produce silicon carbide refractory structures having higher impact strength than those of the prior art, produced fibrous versions of Si/SiC composites, specifically by reactively infiltrating carbon fiber preforms. See, for example, U.S. Pat. No. 4,148,894.

More recently, German Patent Publication No. DE 197 11 831 to Gadow et al. (U.S. Patent Application Publication US-2002-142146 is English language equivalent) disclosed a reaction-bonded silicon carbide composite body featuring high heat resistant fibers, in particular those based on silicon/carbon/boron/nitrogen, for example, carbon or silicon carbide. The composite body was formed by the melt infiltration of a silicon alloy into a porous preform containing the fibers. The alloying element for the silicon-based infiltrant may consist of iron, chromium, titanium, molybdenum, nickel and/or aluminum, with iron and chromium being preferred, and with 5-50% iron and 1-10% chromium being particularly preferred. The alloying is directed to addressing the problem of the jump-like internal strain caused by the volume increase of silicon upon freezing. Previously, in large or thick-walled articles with no alloying, this cooling strain was sufficiently large in many cases as to manifest itself as microfractures throughout the composite body. Thus, the stability of the material was reduced, and a critical growth of the fractures was to be expected under application of alternating thermal and mechanical stress. Accordingly, by alloying the silicon phase, the jump-like strain was reduced or even avoided, thereby solving the problems associated with the silicon cooling strain. The exchange of some brittle silicon for a different metal also led to a clear increase in toughness and ductility of the composite body.

At a minimum, the matrix of Gadow et al. contains iron. In a further refinement, it is preferred to add to the iron-containing silicon matrix, further additives of chromium, titanium, aluminum, nickel or molybdenum in a suitable ratio for the formation of a passivation layer, so that it results in improved oxidation resistance and corrosion resistance.

In spite of the toughening afforded by the alloying, Gadow et al. still rely on fibrous reinforcement. In fact, they attribute part of the strength of the composite to its fibrous reinforcement, and the fact that they treated the fibers gently during the granulation process so as to not damage them and thus impair their strength. Fibers, particularly fibers based on silicon carbide, can be expensive. Further, short fibers such as chopped fibers or whiskers, can pose a health hazard, and efforts must be taken to insure that such fibers do not become airborne or breathed. Fibers are often added to a ceramic composition to enhance toughness through debonding and pull-out relative to the matrix. If another way could be found to toughen the silicon carbide composite bodies of interest, then one could dispense with the fibers.

Chiang et al. (U.S. Pat. No. 5, 509,555) disclosed the production of composite bodies by a pressureless reactive infiltration. The preform to be infiltrated by the alloy can consist of carbon or can consist essentially of carbon combined with at least one other material such as a metal like Mo, W, or Nb; a carbide like SiC, TiC, or ZrC; a nitride like $Si_3N_4$, TiN or AlN; an oxide like $ZrO_2$ or $Al_2O_3$; or an intermetallic compound like $MoSi_2$ or $WSi_2$, or mixtures thereof. In any event, the preform bulk density is rather low, about 0.20-0.96 g/cc. The liquid infiltrant included silicon and a metal such as aluminum, copper, zinc, nickel, cobalt, iron, manganese, chromium, titanium, silver, gold, platinum and mixtures thereof.

In a preferred embodiment of the Chiang et al. invention, the preform could be a porous carbon preform, the liquid infiltrant alloy could be a silicon-copper alloy containing in the range of from about 90 at % to about 40 at % silicon and in the range of from about 10 at % to about 60 at % copper and the carbon preform could be contacted with the silicon-copper alloy at a temperature in the range of from about 900° C. to about 1800° C. for a time sufficient so that at least some of the porous carbon reacted to form silicon carbide. Upon cooling, the dense composite formed thereby can be characterized by a phase assemblage comprising silicon carbide and at least one phase such as silicon-copper alloy, a mixture of silicon and a copper-rich compound, substantially pure copper or mixtures thereof.

One problem with infiltrating multi-constituent liquids into preforms containing large fractions of carbon is that the infiltrant chemistry can change dramatically over the course of infiltration, as well as from one location to another within the preform. Table 3 of Chiang et al. demonstrates this point. There, the infiltrant started out as being about 54 at % Si, 46 at % Cu, but after infiltration into a carbon preform, it was substantially 100% Cu. Such drastic compositional changes can make processing difficult; this same Table revealed that when the infiltrant alloy started out at about 30 at % Si, 70 at % Cu, pressure was required to achieve infiltration. Pressure infiltrations require much more complex and expensive equipment than do pressureless infiltration techniques, and usually are more limited in the size and shape of the parts that can be produced thereby. Thus, while the present invention is not limited to pressureless systems, unless otherwise noted, the infiltrations of the present invention refer to those not requiring the application of pressure.

Chiang et al. stated that their method allows production of composites very near net-shape without a need for additional machining steps. They described a number of non-machining techniques for removing the residual, unreacted liquid infiltrant alloy remaining on the reacted preform surface. Specifically, Chiang et al. stated that following infiltration, the composite body could be heated to a temperature sufficient to vaporize or volatilize the excess liquid alloy on the surface. Alternatively, the reacted preform could be immersed in an etchant in which the excess unreacted liquid infiltrant is dissolved while the reacted preform is left intact. Still further, the reacted preform could be contacted with a powder that is chemically reactive with the unreacted liquid infiltrant alloy such as carbon, or a metal like Ti, Zr, Mo or W.

In U.S. Pat. No. 5,205,970, Milivoj Brun et al. also was concerned with removing excess infiltrant following production of silicon carbide bodies by an infiltration process. Specifically, Brun et al. contacted the reaction formed body with an infiltrant "wicking means" such as carbon felt. More generally, the wicking means could comprise porous bodies of infiltrant wettable materials that are solid at the temperature at which the infiltrant is molten. Preferably, the wicking means has capillaries that are at least as large or larger than the capillaries remaining in the reaction formed body. Thus, infiltrant in the reaction-formed body that was filling porosity remained in the reaction formed body instead of being drawn into the wicking means and leaving porosity in the reaction formed body. The infiltrant could be silicon or a silicon alloy containing a metal having a finite solubility in silicon, the metal being present up to its saturation point in silicon.

The "wicking means" solution of Brun et al. to the problem of removing excess adhered silicon, while perhaps effective, nevertheless requires the additional processing steps of contacting the formed composite body with the wicking means and re-heating to above the liquidus temperature. What is needed is a means for eliminating or at least minimizing the degree of residual infiltrant adhered to the formed composite body.

Thus, it is an object of the present invention to produce a silicon-containing composite body of improved toughness, preferably without reliance on fibrous reinforcement as a toughening mechanism.

It is an object of the present invention to produce a composite body by an infiltration process whereby the residual infiltrant phase has a controllable volume change upon solidification.

It is an object of the present invention to produce a composite body that is more refractory than an aluminum-modified reaction bonded composite body.

It is an object of the present invention to produce a composite body whose physical properties are at least somewhat tailorable by the presence of the additional metallic constituent(s) in the infiltrant material.

It is an object of the present invention to be able to produce a composite body at a temperature that is not significantly higher than the melting point of pure silicon.

It is an object of the present invention to be able to produce composite bodies that are large, unitary structures.

It is an object of the present invention to be able to produce composite bodies of complex shape that are highly loaded in reinforcement material.

It is an object of the present invention to be able to produce composite bodies containing little to no in-situ silicon carbide phase, if required or desirable.

It is an object of the present invention to be able to produce composite bodies in large numbers at a high rate of speed.

It is an object of the present invention to produce a composite body to near-net shape, thereby minimizing the amount of grinding and/or machining necessary to achieve the required dimensions of the finished article.

It is an object of the present invention to produce a composite body where any required grinding or machining can be performed substantially entirely at the preform stage.

It is an object of the present invention to produce a composite body where fine detail can be ground and/or machined into the body at the preform stage.

SUMMARY OF THE INVENTION

These objects and other desirable attributes of the present invention are accomplished through careful control of materials used and of a number of the processing conditions employed in making composite bodies by infiltration of a molten silicon-containing metal. Specifically, and in accordance with a first major aspect of the present invention, the infiltrant material comprises at least two constituents, with at least one of the constituents containing metallic silicon, and at least one other constituent containing metallic titanium.

It has been noted that silicon undergoes a net volume expansion of about 9 percent upon solidification. Thus, in accordance with one preferred embodiment of the present invention, by mixing or alloying the silicon with a material that undergoes a net volume shrinkage upon solidification, it is possible to produce a silicon-containing composite body having a residual infiltrant component that undergoes much less, or perhaps even substantially no net volume change upon solidification. Thus, production of silicon-containing composite bodies that exhibit neither solidification porosity nor solidification exuding of the infiltrant component can be realized.

However, when titanium is mixed with silicon, the constituents of the resulting mixture or alloy tends to chemically react with one another to produce intermetallic compounds. Thus, if this occurs during the process of composite formation by infiltration, the phenomenon may not be so much one of balancing the expansion of silicon with the contraction or shrinkage of titanium upon freezing, but instead might more accurately be described as converting silicon metal to a different substance—a silicon-containing intermetallic compound.

Carbon is frequently added to the porous mass to enhance infiltration. (Unless otherwise noted, from hereon the term "porous mass" will be understood to include the term "preform".) One ramification of using a multi-constituent infiltrant, however, is the change that takes place in the chemical composition of the infiltrant as it infiltrates the porous mass or preform, and specifically as the silicon constituent of the infiltrant metal reacts with the carbon contained therein to produce silicon carbide. Accordingly, the present inventors have discovered the significance and importance of keeping the reactable or "free" carbon content of the porous mass to be infiltrated at relatively low levels. Preferably, the amount of free carbon in the porous mass is kept as low as necessary to accomplish complete infiltration in a reliable manner but without unduly compromising the binder qualities of the carbon when preforms (e.g., self-supporting porous masses) are used. This way, large bodies can be infiltrated with minimal changes in the infiltrant metal's composition, thereby resulting in a silicon carbide composite body having a dispersed residual metal component of relatively uniform composition throughout the body.

The use of a multi-constituent infiltrant composition has additional advantages beyond the ability to produce composite bodies whose residual metal component has zero or near-zero volumetric change (swelling or contraction) upon solidification. Silicon metal is notoriously brittle, so converting silicon to a different substance converts a brittle substance to one that is less brittle. Further, while silicon metal is fairly hard as metals go, silicon intermetallics are harder still. Hardness is a desirable property in many candidate applications, such as ballistic armor and components for precision equipment.

DEFINITIONS

"Blockers" or "Infiltration blockers", as used herein, mean materials that can be used to halt the progress of infiltration of the molten infiltrant.

"Foundation" or "foundation material", as used herein, means the substantially non-infiltratable material that is used to support the components that participate in the infiltration process, such as the molten infiltrant and the porous mass to be infiltrated. These materials can be porous or not, and can be either free-flowing or self-supporting.

"RBSC", as used herein, means reaction-bonded silicon carbide.

"Reaction-Bonding", "Reaction-Forming", "Reactive Infiltration" or "Self-Bonded", as used herein, means the infiltration of a porous mass (such as a preform) containing carbon (in a form that is available to react) by an infiltrant containing silicon metal to produce a composite body containing at least some silicon carbide produced in-situ.

"Reinforcement", as used herein, means a material that is provided to the porous preform to be infiltrated, and is substantially non-reactive with the molten infiltrant. Thus, the reinforcement material is present in the formed composite body, and is generally distributed throughout the composite body, particularly through the phases of in-situ SiC and residual infiltrant material. Thus, the physical properties of the reinforcement contribute at least in part to the overall physical properties of the composite material. "Filler" is substantially synonymous with "reinforcement".

DETAILED DESCRIPTION OF THE INVENTION

According to the methods of the present invention, a porous mass containing at least one reinforcement material and optionally carbon is infiltrated with a molten, multi-constituent metal containing at least silicon and titanium. Typically, a wetting condition exists or is created between the molten metal and the bodies of material making up the porous mass so that the infiltration can occur by capillarity. Although at least one of silicon and titanium metal may remain in the formed composite body, as for example, residual infiltrant material, more commonly, at least some of the titanium chemically reacts with at least some of the silicon constituent of the infiltrant material to form one or more titanium-silicon intermetallic compounds. The silicon-containing intermetallics, e.g., "titanium silicides" are distributed throughout the composite body, as are the one or more reinforcement materials. When the porous mass contains some reactable ("free") carbon, the silicon component of the infiltrant may react with this carbon to form silicon carbide. This silicon carbide is sometimes referred to as "in-situ" silicon carbide. It may be possible to coax the titanium component into also participating in the reaction with carbon, if such would be desirable, but in a preferred embodiment the titanium constituent hardly participates, forming at best only a slight amount of titanium carbide(s), and the inventors are satisfied with this situation.

If the starting amount of infiltrant metal is insufficient to fill the interstices of the porous mass, at least some of the residual, unreacted metal in the body may be distributed as discrete, isolated pockets. Usually an excess of infiltrant metal is supplied to the porous mass, and the residual metal in the composite body is interconnected.

In the present invention, the other constituent(s) of the infiltrant metal is one that chemically reacts with silicon metal to form an intermetallic compound, i.e., an intermetallic silicide. Many silicides are refractory, and unlike some other metals that may be alloyed with silicon without reaction, may help to preserve a refractory character to the overall composite body. Silicon metal is relatively refractory, having a melting point of about 1410° C. But silicon metal suffers from a number of drawbacks, most notably its inherent brittleness, at least at temperatures below its ductile/brittle transition. Also, silicon is unusual in that it exhibits a jump-like increase in volume upon solidification from the molten state. This creates problems in structures, particularly large and/or intricately shaped structures made from composite materials containing silicon metal, such as RBSC. In particular, the silicon metal constituent expands by about 9% during solidification, and if this expansion does not break the structure, it often results in droplets or other forms of excess silicon coming out of the composite material and adhering, often tenaciously, to a surface of the composite material. The silicide formation of the present invention, then, is not merely alloying the silicon metal, but rather is a chemical reaction that converts the silicon to a different substance. Most silicides do not exhibit the jump-like volumetric increase upon solidification that silicon does.

To form the silicon-titanium infiltrant material, elemental silicon and titanium may be placed into a crucible and heated to a temperature above their respective melting points. However, since titanium and silicon can form intermetallics, for fastest results the heating may also be above the melting point of any intermetallics that might form. This also suggests that the titanium does not have to be initially provided in elemental form, but instead could itself be provided in the form of one or more titanium silicide intermetallics. However, and for simplicity, in these initial investigations, the titanium is being provided to the silicon in elemental form to create the infiltrant material.

As shown in the titanium-silicon phase diagram (see FIG. 1, below), titanium forms a number of intermetallic compounds with silicon. Most of these silicides are titanium-rich, that is, they are on the titanium side of the phase diagram. Two that are on the silicon side, and thus are of at least initial interest to the present invention are $TiSi_2$ and TiSi, at 33 and 50 atomic percent Ti, respectively. $TiSi_2$ is of interest to the present invention because it is refractory in the sense that it has a relatively high melting point, but not so high that excessively high temperatures are required to melt the titanium-silicon infiltrant metal composition required to form this phase. Note that $TiSi_2$ has a melting point that is slightly higher than that of silicon metal, so if any silicon metal is left in the composite following infiltration and reaction, the $TiSi_2$ will freeze out first. As long as the amount of free silicon is not excessive, this could be desirable from the standpoint that the last bit of metal to freeze is silicon, which will expand, thereby tending to mitigate the effect of solidification porosity.

The present invention encompasses placing one, several or all of the constituents of the multi-component infiltrant within the porous mass to be infiltrated, or at an interface between the mass and an adjacent body of the infiltrant metal. Preferably though, the constituents of the infiltrant material are provided as an alloy or mixture, possibly in ingot or other bulk form that is then brought into contact with the porous mass to be infiltrated. The infiltrant metal may be placed into direct contact with the porous mass to be infiltrated, or the infiltrant metal may remain substantially isolated from the porous mass, with a wicking means interposed between the two to create a pathway or conduit for the molten infiltrant metal to migrate toward and into the porous mass. The wicking means could be most any material that is wet by molten infiltrant metal, with silicon carbide being preferred.

In one embodiment that is particularly useful for making hollow composite bodies, or at least a composite body having a shaped interior surface, the solid body of infiltrant metal may be shaped, for example, by machining, and then the porous mass to be reactively infiltrated is contacted to at least a portion of that shaped surface of the infiltrant metal. When the infiltrant metal infiltrates the porous mass, that portion is reproduced in opposite or inverse form in the formed silicon-containing composite body. For instance, if the shaped infiltrant metal is substantially completely covered with the material of the porous mass, the resulting composite body is hollow, and whose interior surfaces are the inverse or opposite shape of the infiltrant metal. That is, if the shaped body of infiltrant metal still existed, it could be fit with the formed composite body like two jigsaw puzzle pieces. The thickness of the formed composite body here may be regulated by the amount or thickness of porous material brought into contact with the infiltrant metal, and by the amount of infiltrant metal available for infiltration.

In one embodiment, the present invention contemplates producing in-situ silicon carbide as a constituent of the composite body to be formed. Accordingly, the porous mass or preform to be infiltrated contains free carbon, and at least one constituent of the multi-constituent infiltrant material is silicon, and at least one other constituent is or includes titanium.

The ability to toughen silicon-containing composite bodies through additions to the silicon infiltrant has important beneficial consequences. For instance, previously, the preferred approach to toughen these rather inherently brittle materials was to add a fibrous reinforcement to the composite. But this approach has a number of drawbacks. Long fibers are not very amenable to ceramic processing requiring stirring. Short fibers may pose a respiration hazard. The presence of fibers may degrade the surface finish that can be achieved during green machining, particularly if the fibers are added in the form of bundles, which is a popular approach in the prior art. For the toughening to be realized, the fibers should debond and pull out of the surrounding matrix. Often, one or more coatings need to be applied to the fibers to achieve this effect, which adds to cost and complexity of the system. Coated fibers often have to be treated gently during processing, lest the coatings be damaged, and this would likely eliminate certain processing techniques such as Muller mixing or ball milling. Thus, the ability to toughen silicon-containing composites without reliance on fiber additions is significant.

In general, the temperature at which the infiltration is conducted is the lowest at which infiltration occurs quickly and reliably. Also, in general, the higher the temperature, the more robust is the infiltration. Unnecessarily high infiltration temperatures are not only wasteful in terms of energy costs and the extra heating and cooling time required, but the more likely it is that undesired "side" reactions can occur. A number of ceramic materials that are usually thought of as being inert and uninfiltratable at moderate temperatures (e.g., aluminum oxide, boron nitride, silicon nitride) can lose their inert character or are infiltrated by silicon-titanium melts at elevated temperatures (e.g., about 1550° C. and above), particularly under vacuum. Thus, it becomes quite a challenge to house or support a porous mass to be infiltrated and to minimize the degree of over-infiltration into the supporting material, or reaction therewith. Such over-infiltration typically results in the over-infiltrated material being bonded to the infiltrated mass, necessitating costly grinding or diamond machining for its removal.

The atmosphere in which the infiltration of a silicon and titanium-containing metal is conducted is usually one that is inert or mildly reducing. Accordingly, argon, helium, forming gas and carbon monoxide may be used. A vacuum environment is preferred, however, at least from the standpoint of facilitating the reliability or robustness of infiltration.

Of course, the mass or preform to be infiltrated by the silicon/titanium-containing infiltrant must be one that is permeable to the infiltrant under the local processing conditions. Given sufficient temperature, e.g., about 2150° C., a porous mass of pure silicon carbide can be infiltrated by silicon metal in a pressureless manner (see for example, U.S. Pat. No. 3,951,587 to Alliegro et al.), but more typically, the porous mass contains some elemental or free carbon to facilitate the process. The more carbon that is present, the more silicon carbide that is produced in-situ. While it is possible to reactively infiltrate a porous mass containing large amounts of carbon, such is generally undesirable in the context of the present invention for a variety of reasons. For example, the molten infiltrant metal will change too much compositionally from one zone in the preform to the next. Large compositional changes are usually undesirable for at least two reasons: First, the altered metal composition may be such that it no longer wets the porous mass to be infiltrated. Second, a porous mass that is successfully fully infiltrated would have to be maintained at some elevated temperature for a period of time to allow the distribution of constituents of the infiltrant metal to equilibrate. For large components, such "annealing times" could be so long as to be impractical.

Another reason why large amounts of carbon are undesirable is due to the volume change of about 2.35 times upon chemical reaction of the carbon. If the volume of the SiC that is produced cannot be accommodated in the preform, the composite body could swell, hurting dimensional control, or worse, could result in cracking.

Figure 2:
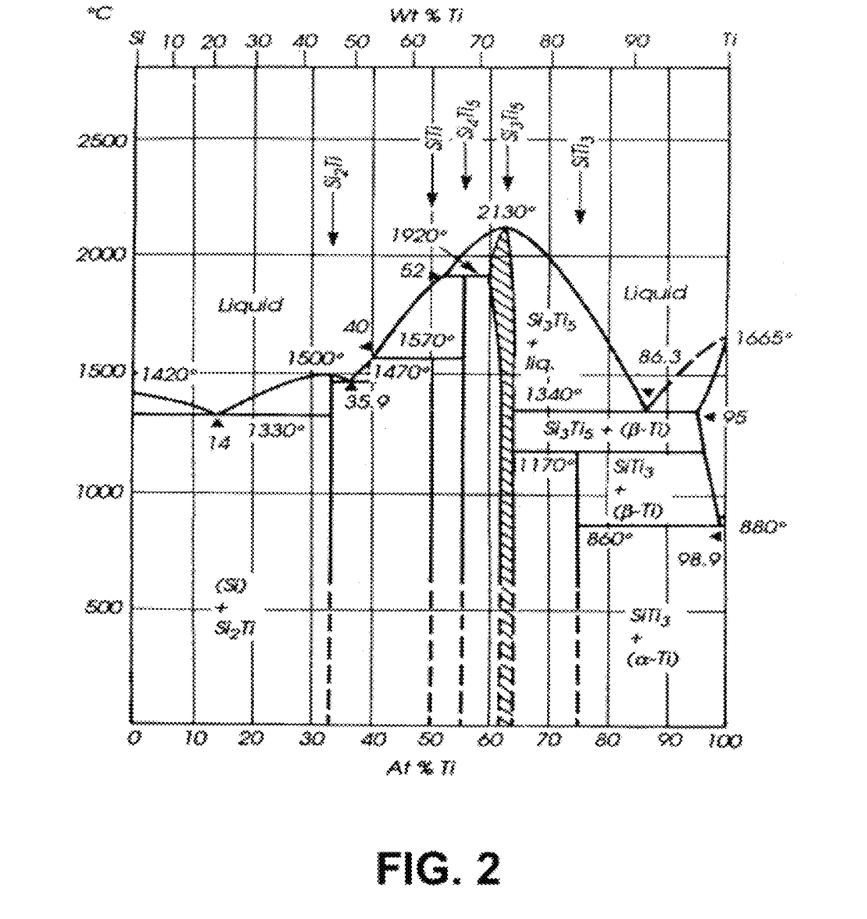
FIG. 2 is an optical photomicrograph of prior art RBSC showing large amounts of carbon reaction cause the formed in-situ SiC to form large zones of interconnected SiC.
Figure 3:
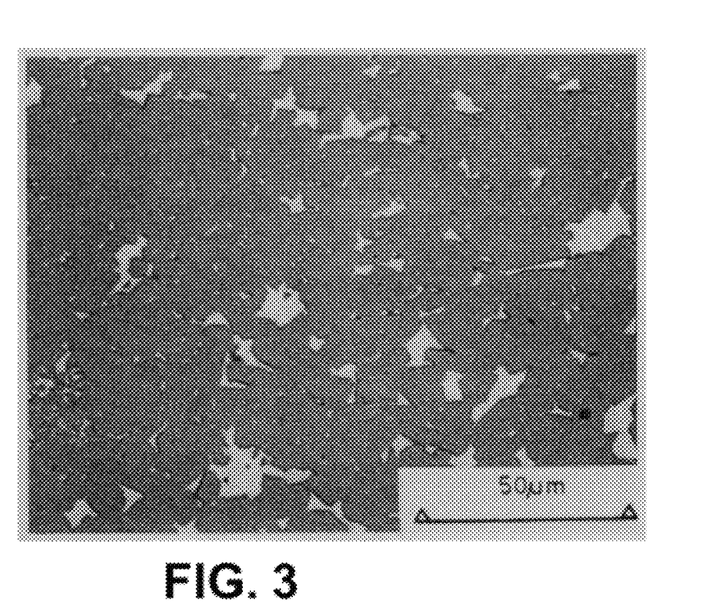
FIG. 3 is an optical photomicrograph which represents the assignee's unalloyed RBSC material, such as that of Example 1 herein.

Still further, and as illustrated in FIG. 2, large amounts of carbon reaction cause the formed in-situ SiC to form large zones of interconnected SiC. It is as though these zones behave as one large SiC particle, which is deleterious to some properties such as strength and ballistic resistance, and impairs the surface finish that can be attained in machining or grinding. This micrograph, which appears on page 47 of R. Morrell's *Handbook of Properties of Technical Engineering Ceramics* (1985), is representative of prior art reaction-bonded silicon carbide. The contrast with FIG. 3, which represents the assignee's unalloyed RBSC material, such as that of Example 1 herein, is striking. The microstructure of this preferred embodiment almost appears as though a loose mass of carbon-free SiC particulate was infiltrated with silicon with substantially no reaction and no in-situ SiC formation, because, unlike FIG. 2, one can see nearly the entire "perimeter" of each SiC particle. However, there is indeed some in-situ SiC present, due to the presence of some carbon in the preform. In fact, the assignee's RBSC generally contains enough in-situ SiC as to form a network, e.g., interconnect the SiC reinforcement bodies together, although the network is rather tenuous or thin, yielding a small or light amount of such interconnectivity.

Thus, producing a composite body having a relatively small grain size with only a light degree of interconnection by the in-situ SiC matrix phase represents a preferred embodiment of the invention. In this preferred embodiment, it is also important to keep processing temperatures from being "excessive", e.g., temperatures at which the grains can grow appreciably, or sinter together. For example, the transformation of silicon carbide from the beta to the alpha crystallographic form occurs at about 2050° C. The crystallographic transformation is often accompanied by extensive grain growth. Depending upon the exact conditions, it may be possible to heat to a slightly higher temperature (perhaps about 2100° C.) and still avoid this recrystallization. Sintering is also dependent to a degree on particle size, but the instant inventors note in the prior art where a SiC preform tube was pre-sintered at about 2150° C. prior to reactive infiltration with silicon. See, for example, U.S. Pat. No. 4,174,971 to Schrewelius. Accordingly, to maintain the low amount of interconnectivity to the preform particles, and to maintain the beta form of the in-situ SiC that is characteristic of this preferred embodiment, the instant inventors do not recommend conducting the infiltration, or post-processing the infiltrated mass, at temperatures in excess of about 2000° C.

Often it is desirable to produce a composite body that is highly loaded in one or more hard or high-stiffness fillers such as SiC. It may be tempting to achieve high SiC loading by forming large amounts of beta (in-situ) SiC. Again, this approach is not preferred. Instead, what is desired is to reactively infiltrate a porous mass or preform that is highly loaded not with carbon but rather with the hard filler material(s). As an alternate embodiment of the invention, a preform highly loaded with hard filler materials but little or no reactable carbon is infiltrated with molten silicon-titanium alloy or silicon-and-titanium-containing metal.

In this alternate embodiment, the silicon-titanium-infiltrated composite bodies of the instant invention can be made by a modified siliconizing process. Here, a multi-constituent molten infiltrant containing silicon and titanium, which may be a silicon-titanium alloy, is contacted to a porous mass of ceramic material that is wettable by the molten infiltrant under the processing conditions, which is generally taken to be a vacuum or inert gas (e.g., argon) environment. One ceramic material that can meet these requirements is SiC, which can be in the form of substantially non-connected particles such as a loose mass of particulate, or may be in the form of a lightly sintered or "bisque-fired" material, or may be heavily sintered and highly dense (but still containing interconnected pores). The presence of carbon in the reaction-bonding process assists in the infiltration there. Since this carbon is substantially if not completely lacking in the modified siliconizing process, the latter is generally not as robust an infiltration process as is the reaction-bonding process. Accordingly, somewhat higher infiltration temperatures may be required, and/or a vacuum environment (as opposed to inert gas environment, for example) may be required. Titanium-containing reinforcement materials such as titanium carbide or titanium diboride may also work as the porous mass.

As a further alternative embodiment, the instant inventors also note that some applications, most notably the refractory applications, may benefit from having a relatively high degree of interconnection of the preform particles to one another. This can be accomplished by introducing a relatively large amount of carbon to the preform to produce large amounts of in-situ SiC, or by sintering the preform prior to or during infiltration, or some combination of these.

What the inventors prefer for the main embodiment of their invention is a porous mass containing not more than about 10 percent by volume carbon, and more preferably not more than about 6 percent. For many of the products contemplated by the present invention, a representative selection of which are shown in some of the Examples, a particularly preferred range is about 1 volume percent to about 5 percent.

The matter that makes up most or all of the balance of the porous mass may consist of one or more materials that are substantially inert under the process conditions, e.g., "reinforcement materials". Candidate reinforcements for use in the present invention would include the carbides such as SiC, $B_4C$, TiC and WC; the nitrides such as $Si_3N_4$, TiN and AlN; the borides such as $SiB_4$, $TiB_2$, and $AlB_2$; and oxides such as $Al_2O_3$ and MgO. The form of the reinforcement may be any that can be produced, for example, particulate, fiber, platelet, flake, hollow spheres, etc. The individual reinforcement bodies may range in size from under a micron to several millimeters, such as about 5 millimeters, with sizes ranging from several microns to several hundred microns being common. To best produce the preferred microstructure, the inventors prefer the form of the reinforcement to be individual, separate bodies such as particles, but in an alternative embodiment also embraced by the present invention, the reinforcement can be in reticulated, skeletal or otherwise interconnected form.

Many of the above-mentioned materials are not intrinsically infiltratable by silicon-containing melts under reasonable infiltration conditions. Thus, some of these materials might be candidates as the foundation or infiltration blocker materials, to be described in more detail later. However, by applying a coating material that is wettable and/or reactive with the silicon-containing infiltrant material, for example, carbon, at least some degree of infiltration into these materials usually can be achieved.

Other candidate reinforcements may tend to chemically react during processing. Boron carbide, for example, tends to react at high temperature both with molten silicon and with molten titanium. Coating the boron carbide reinforcement may address the problem. Alternatively, the molten infiltrant sometimes can be modified compositionally to suppress this tendency for reaction. Dissolving some boron and optionally also some carbon into molten silicon-titanium infiltrant can help in this regard. Preferably the infiltrant is saturated with dissolved boron to help suppress the boron carbide reaction.

Even when the reinforcement includes silicon carbide, especially in particulate form, it is still possible to distinguish a silicon carbide matrix that is reaction-formed from the silicon carbide making up the reinforcement or filler material. Specifically, the reaction-formed silicon carbide typically is of the beta polymorph, at least under the instant processing conditions, e.g., relatively low processing temperatures. In contrast, most commercially available silicon carbide, particularly the commodity grades, is the alpha (i.e., high temperature) form that is so commonly used as a reinforcement material. Accordingly, analytical techniques known to those in the art can distinguish between the two forms and can provide at least approximate quantitative data as to the relative amounts of each that are present in the composite body. However, if the infiltration is conducted a t high temperature, or if the composite body is post-processed at high temperature, e.g., above about 2000° C., the beta polymorph transforms irreversibly to the alpha form, making the in-situ SiC indistinguishable from the reinforcement SiC on this basis.

Porous masses containing one or more reinforcements may range appreciably in terms of their packing or theoretical density. For example, a porous mass comprising flakes, disorganized fibers, or a reticulated structure may be only 5 to 10 percent dense. At the other extreme, a sintered preform may be 85 to 95 percent dense. Infiltration, however, at least that using a bulk molten infiltrant, requires at least some of the pores of the porous mass be interconnected and contiguous to the exterior of the mass; closed pores cannot be infiltrated. Moreover, the choice of processing used to fabricate the preform can influence the packing density, as processing that uses a liquid phase in general packs more densely than does a technique that does not use a liquid vehicle, such as dry pressing. Thus, if nominally mono-sized reinforcement bodies can be dry pressed to densities of about 30-55 vol %, then slip or sediment cast preforms might be about 40-65 vol % loaded. However, reinforcement bodies having different sizes may be blended together, for example, to increase particle packing. Thus, such dry pressed preforms might be about 35-65 vol % loaded, and those cast using a liquid phase such as slip casting might be about 45-70 vol % loaded, and sediment cast or thixotropic cast preforms might be about 45-75 or 80 vol % loaded, or possibly even as high as about 85 vol %, depending upon the specific parameters. As can be seen, preform loading is very flexible and can be engineered to a high degree.

Although not required, a carbon source that may be added to the porous mass or preform usually can desirably take the form of elemental carbon, such as graphite, carbon black or lampblack. Thus, the carbon may be in crystalline or amorphous form. The form of the carbon component can become significant, however, when attempting to infiltrate reinforcements that are normally difficult to infiltrate, e.g., the oxides. While carbon in particulate form may be satisfactory for infiltrating a mass of silicon carbide, other reinforcements may necessitate that the carbon be reticulated or forming a network or skeletal structure. Especially preferred is carbon in the form of a coating on the reinforcement bodies. Such a form of carbon can be achieved by introducing the carbon into the porous mass in liquid form, as for example, a resin. The porous mass containing such a carbonaceous resin is then thermally processed to decompose or pyrolyze the resin to solid carbon, which may be graphite, amorphous carbon or some combination thereof. A number of carbonaceous resins are available including epoxy resins, phenolic resins and furfuryl alcohol. What is preferred in the present invention are carbohydrate-based resins such as those based on sugars or starches, but if more carbon is desired in the preform, then one may wish to consider resins such as phenolic resin or furfuryl alcohol, which offer higher "char yields". The resin infiltration and pyrolysis cycle may be repeated one or more times, which can also increase carbon content.

In addition to assisting in the infiltration process, another important role played by the carbonaceous resin is that of a binder. Although one can infiltrate a loose mass of reinforcement particulate, the more preferred route, especially where the goal is to make an article of some particular and desired shape, is to use a self-supporting preform. Typically, a loose mass of reinforcement is mixed with a binder, preferably here a carbonaceous binder, and then pressed or cast or molded to a desired shape using techniques known in the art. Curing the binder then renders the formed body self-supporting.

Through careful observation and experiment, the instant inventors have noted the general conditions (or trends in changing conditions) whereby infiltration tends to occur or is enhanced, and those conditions under which infiltration tends not to occur, or tends to be inhibited. For example, the inventors have observed that reactive infiltration of an infiltrant comprising silicon into a porous mass comprising carbon occurs more robustly when the carbon is present in elemental form rather than chemically combined with other elements. Furthermore, the infiltration is more robust when the elemental carbon is present in three-dimensionally interconnected form, as opposed to discrete particle form. When the porous mass includes a component other than elemental carbon, for example, aluminum nitride, the three-dimensionally interconnected elemental carbon phase could be present as, for example, a coating on at least some of the aluminum nitride bodies. Moreover, the infiltration is more robust when the temperature of infiltration is increased, both in terms of absolute temperature as well as in terms of the homologous temperature (e.g., percentage or fraction of the melting temperature). Still further, infiltration is more robust when conducted under vacuum as opposed to inert gas atmosphere such as argon.

Traditionally, graphite has been the traditional material of choice for housing the molten infiltrant and preform. Now, careful observation of the differences in infiltratability of various porous masses has enabled these differences to be exploited to advantage. Specifically, and in a preferred embodiment, those materials that are substantially non-infiltratable under the process conditions can be used as "foundation" materials for supporting the porous mass to be infiltrated. This result is significant because these non-infiltratable support materials are usually significantly cheaper than the molds, housings or containers, which are sometimes referred to as "boats", and which are often fabricated from graphite.

Even if a silicon-titanium infiltrant composition is used that exhibits overall net solidification shrinkage, with thoughtful lay-up design of the assemblage of preform, infiltrant material and support material, the solidification porosity that often results from this shrinkage largely can be avoided. For example, one could provide infiltrant material in excess of the minimum needed to fully infiltrate the preform, in other words, a "reservoir" of infiltrant supplying the mass to be infiltrated. The assemblage is then designed such that the last region to freeze in the composite body is supplied with molten infiltrant material from outside the body. In this way, any solidification porosity occurs outside of the composite body. Sometimes directional solidification of the composite body is employed to accomplish this desired result.

The opposite problem actually is more frequently encountered where silicon infiltrations are concerned: where the infiltrant expands upon solidification, and the composite body cannot hold the extra volume of material. The composite body thus exudes the (now) excess infiltrant. The exuded silicon may manifest itself as droplets or beads on the surface of the composite body, and often strongly bonded thereto. This nuisance material may have to be removed by grinding or grit blasting, with the concomitant risk of damaging the attached composite body. Also, it would be desirable to not have to undertake this extra manufacturing step.

An even more serious consequence of the solidification swelling of the silicon constituent is possible swelling of the entire composite structure, thereby complicating efforts to produce net-shape parts. Still worse is the risk that such solidification swelling will cause cracking of the composite body, a risk which increases as the size of the composite body increases.

Thus, the ability to reduce or even eliminate this solidification expansion of the silicon constituent of the infiltrant material by chemically converting some or substantially all of the residual silicon metal to a substance that does not exhibit such solidification represents an important advance in the field of silicon-containing composite materials. Not only may such composite bodies be made more dimensionally accurate in the as-infiltrated condition, but may be produced without requiring an extra process step to remove the exuded silicon.

Whereas previously producers of silicon infiltrated composite materials were resigned to having to perform grinding or machining post-infiltration, the new reality is that such final grinding/machining can be greatly minimized, even eliminated in some cases. Thus, this operation, to the extent that it needs to be performed at all, can now be performed before silicon infiltration, when the porous mass is still in the preform stage. This "green machining" is considerably easier and faster than grinding or machining a dense composite body. However, the instant inventors recognize that in order to obtain precision and fine detail at this stage, the size of the bodies making up the reinforcement component of the preform may need to be limited. This is because, unlike final grinding/machining, green machining tends to remove the bodies in their entirety, rather than remove portions of them. In other words, the limit of machining detail at the preform stage is limited by the surface finish that can be imparted to the preform, which in turn is controlled by the size of the bodies making up the preform. The instant inventors have found it desirable that substantially all preform reinforcements, e.g., particulates, flakes, etc., be less than about 200 microns in size, and preferably at least 90 percent by volume be smaller than about 100 microns, and even more preferred that at least 90 volume percent be smaller than about 50 microns in size. For instance, the preforms used in the examples to follow contain a ceramic component featuring particulate whose median size is about 13 microns.

The ability of silicon infiltration technologies, or more particularly, the discovery of processing parameters pertaining to silicon infiltration technology that permit, or at least indicate the possible feasibility of fabricating large intermetallic-containing structures of complex shape provides guidance in the selection of a preforming technique that can best take advantage of this potential. Specifically, fulfilling the potential of silicon infiltration technology tends to drive the preforming selection process away from preforming techniques such as dry pressing or injection molding, which are good for high volume production, but generally only of relatively small parts, in part because the pressing or injection pressures that are needed tend to be high. A complex shape requirement then tends to drive the preform processing away from techniques such as tape casting or extrusion, as these tend to used for making preforms that are flat or sheet-like, or of uniform cross-section, respectively. A requirement for relatively high loading of the preform, e.g., filler or reinforcement material, tends to drive the preform processing away from techniques such as compression molding. This technique may be thought of as a low-pressure form of dry pressing, and as with dry pressing, it is not generally conducive to high loading.

The present invention will now be further described with reference to the following Examples.

EXAMPLE I

No Alloying; Not the Present Invention

This example demonstrates the production of a reaction bonded Si/SiC composite body. More specifically, this Example demonstrates the infiltration of substantially pure silicon into a silicon carbide preform containing an interconnected carbon phase derived from a resinous precursor.

Figure 4:
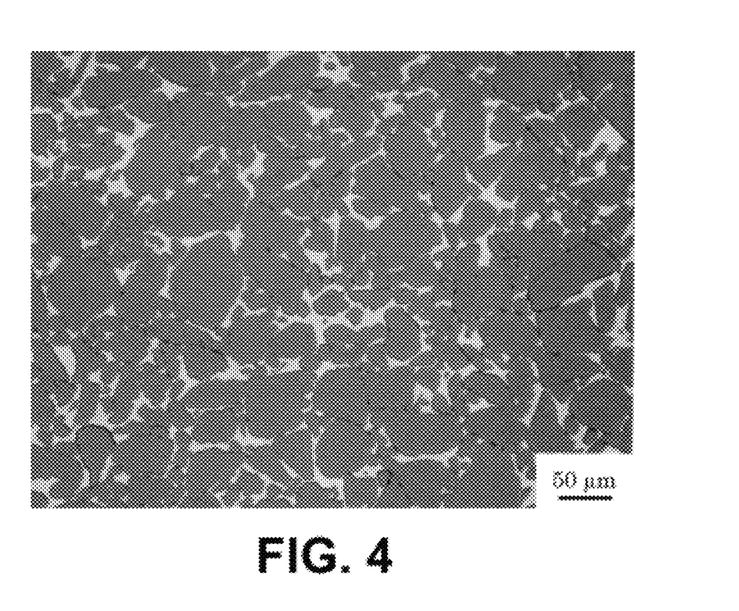
FIG. 4 is a schematic of a reaction bonding process for making Si/SiC composites.

The fabrication of reaction bonded SiC (RBSC) is rather straight forward, and has been described in detail elsewhere. As shown in FIG. 4, a preform consisting of SiC particles and carbon is produced, and subsequently infiltrated with molten Si. During infiltration, the Si and carbon react to form SiC that bonds the ceramic particles together into a ceramic network—thus the name reaction bonded. In the assignee's standard practice, the carbon in the preform is the result of a pyrolyzed binder (i.e., no carbon or graphite powder is added).

First, a preform was prepared as follows. One hundred parts by weight of CRYSTOLON blocky (regular), green silicon carbide particulate (St. Gobain/Norton Industrial Ceramics, Worchester, Mass.) was combined with fifteen parts of KARO corn syrup (CPC International Inc., Englewood Cliffs, N.J.) by mixing. The silicon carbide particulate content consisted of about 70 percent having a median particle size of about 56 microns (Grade F 240), and the balance having a median particle size of about 13 microns (Grade F 500). The mixing was conducted in a Model RV02 Eirich high shear mixer as follows: First the SiC particulates were mixed for 2 minutes on the "low" speed. Then half the corn syrup was added and mixing continued on "low" for an additional 1 minute. Then mixing was interrupted to scrape the mixing bowl. Then the remaining half of the corn syrup was added and mixed for 1 minute on "low". After another interruption to scrape the bowl, mixing resumed on "low" for 2 additional minutes, then finished on the "high" speed for 1 minute.

The admixture was pushed through a 16 mesh screen (average opening size of about 1180 microns) to break up agglomerates.

Next, coupons measuring about 51 mm square by about 10 mm thick were uniaxially pressed in a steel die under an applied pressure of about 28 MPa.

The preform containing the SiC particulate and the corn syrup was ejected from the die and placed into a controlled atmosphere furnace. In an atmosphere of flowing commercially pure nitrogen, the preform was heated to a temperature of about 800° C. at a rate of about 100° C. per hour. After maintaining this temperature for about 2 hours, the corn syrup had been substantially completely pyrolyzed to carbon. The furnace and its contents were cooled at a rate of about 200° C. per hour. After cooling back substantially to ambient temperature, the preform was recovered from the furnace and calculated (based upon bulk density measurements) as having a volumetric loading of about 61 percent of theoretical. Carbon analysis via oxidation, performed on a similar sample, showed the presence of about 2.5 percent by weight of free carbon in the preform. Thus, this preform exhibited a SiC loading of about 59 percent.

Next, a lay-up to confine the infiltration process was prepared. Specifically, the interior surfaces of a Grade ATJ graphite housing (Union Carbide Corp., Carbon Products Div., Cleveland, Ohio) measuring about 375 mm by about 298 mm by about 51 mm deep was coated with a boron nitride slurry or paint at a rate or thickness of about 3.1 mg per square centimeter. The boron nitride paint was prepared by mixing four parts by weight of LUBRICOAT boron nitride paste (ZYP Coatings, Oak Ridge, Tenn.) with three parts water and spray coating using a Model 95 Binks spray gun.

The 46-gram preform was placed into the coated graphite housing. About 23 grams of silicon in lump form (Elkem Metals Co., Pittsburgh, Pa.) and comprising by weight about 0.5 percent Fe (max) and the balance Si, was placed on top of the preform. The top of the housing was covered with a loose-fitting (non-hermetic) BN coated graphite lid.

The completed lay-up was then placed into a vacuum furnace at about ambient temperature (e.g., about 20° C.). The air was evacuated using a mechanical roughing pump, and a rough vacuum of about 25 millitorr residual pressure was thereafter maintained. The lay-up was then heated from ambient temperature to a temperature of about 1350° C. at a rate of about 200° C. per hour. After maintaining a temperature of about 1350° C. for about 1 hour, the temperature was further increased to a temperature of about 1550° C. at a rate of about 200° C. per hour. After maintaining a temperature of about 1550° C. for about 1 hour, the temperature was decreased to a temperature of about 1450° C. at a rate of about 100° C. per hour. Without holding at this temperature, the lay-up temperature was further decreased to a temperature of about 1300° C. at a rate of about 25° C. per hour, which was immediately followed by a cooling at a rate of about 200° C. per hour to approximately ambient temperature.

The furnace atmosphere was brought back to ambient pressure and the lay-up was removed from the furnace. Disassembly of the lay-up revealed that silicon had fully infiltrated the preform to form a composite body comprising silicon carbide and silicon. After sandblasting off the residual silicon at the surface where infiltration commenced, a density of the composite body of about 2.89 g/cc was measured by the water immersion technique. Using the theoretical densities of SiC and Si, the body was calculated as being about 64 percent by volume of SiC and 36 percent Si. Of this 64 vol % SiC, about 5 vol % represents SiC that was produced in-situ (64%-59%).

The properties of the assignee's currently fabricated RBSC ceramic (grade SSC-802) are provided below in Table 1. These data are from a combination of sources, namely QC data on actual deliverables, the standard data sheet, and recent test results (e.g., for CTE).

TABLE 1

Properties of assignee's Semiconductor Grade Reaction Bonded Silicon Carbide Ceramic (Grade SSC-802)

| Property | Result |
|---|---|
| Density (g/cc) | 3.00 ± 0.02 |
| Young's Modulus (GPa) | 365 |
| CTE, RT-100° (ppm/K) | 2.5 |
| Thermal Conductivity (W/mK) | 185 |
| Flexural Strength (MPa) | 280 |
| Fracture Toughness (MPa-m$^{1/2}$) | ~4 |

TABLE 1-continued

Properties of assignee's Semiconductor Grade Reaction Bonded Silicon Carbide Ceramic (Grade SSC-802)

| Property | Result |
|---|---|
| Calculated Composition via Rule of Mixtures Assuming Density of 3.00 g/cc* Quantitative XRD* | Si Content: 23.9 vol. % SiC Content: 76.1 vol. % Si: 16.7 wt. % (21.6 vol. %) SiC: 83.3 wt. % (78.4 vol. %) |

*Reasonably good agreement from two methods to assess composition of relatively simple Si—SiC system.

EXAMPLE II

Belonging to the Instant Invention

This Example discusses a specific candidate process improvement for reaction bonded SiC, namely, the addition of Ti to Si infiltrant.

Figure 1:
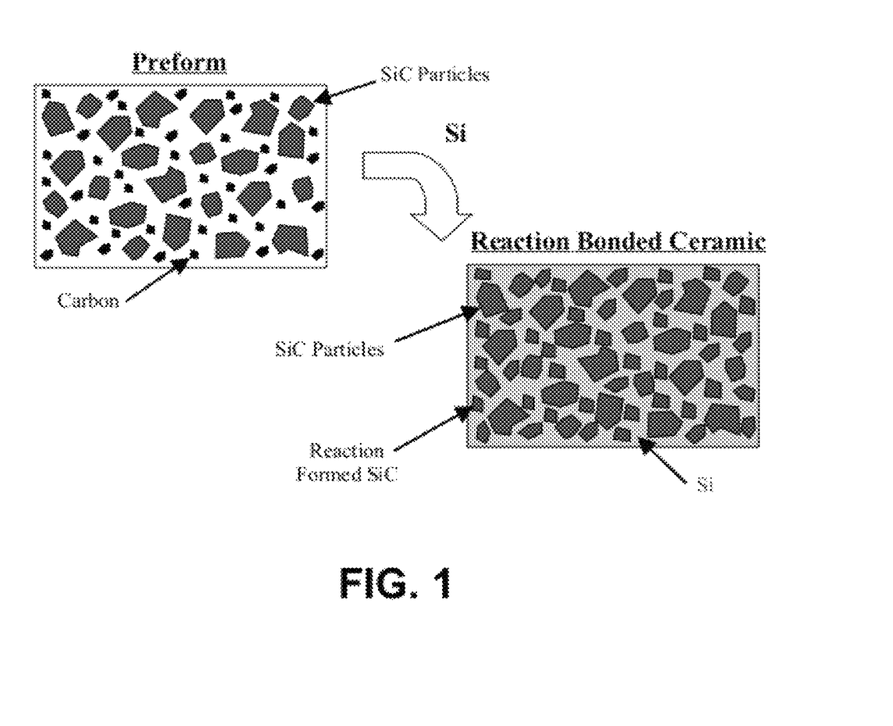
FIG. 1 is the titanium-silicon binary phase diagram.

To infiltrate the preforms with a Ti—Si alloy rather than pure Si, a two-step process was used. First, using vacuum melting, a Ti—Si alloy was produced. Second, the alloy was used in place of the standard pure Si in a typical reactive infiltration run. As shown in FIG. 1 (*Smithells Metals Reference Book—Seventh Edition*, edited by E. A. Brandes and G. B. Brook, Butterworth-Heinemann, Oxford, UK, 1998), the melting point of Ti—Si is not excessively above that of pure Si at Ti contents below about 50 wt. %. Moreover, by increasing the Ti content, the amount of elemental Si in the structure should decrease (converting to a Ti—Si intermetallic—either $TiSi_2$ or TiSi, depending on the composition upon freezing). By way of comparison, the previously disclosed work by Schrewelius (U.S. Pat. No. 4,174,971) featured SiC plus carbon preforms being infiltrated with molten Mo—Si alloy instead of pure Si. Upon cooling, $MoSi_2$ formed as the second phase. Note that due to the high melting point of Si—Mo alloys, the infiltration temperature used was very high at 2150° C., as compared to the approximately 1500° C. temperature used by the assignee for its standard molten Si infiltration process. The goal of the work of Schrewelius was to produce high performance $SiC/MoSi_2$ composite heating elements. For the present program, attempts are being made to infiltrate SiC plus carbon preforms with molten Si—Ti, with the goal of forming Si—Ti intermetallics upon cooling from the processing temperature.

To study the effects of this variable (Ti additions to Si alloy) on the reaction bonded SiC product, three levels of Ti addition were investigated (one being a control): Si, Si-15 wt. % Ti, and Si-40 wt. % Ti. The infiltrations were conducted under vacuum. The temperature for infiltration was slightly higher than for "standard" (not of the present invention) infiltrations of unalloyed silicon because of the slightly higher liquidus temperature, especially for the Si-40 wt % Ti alloy, but still were kept below about 1600° C. All other parameters were kept substantially the same as in Example I.

TABLE 2

Property Data on Improved Reaction Bonded SiC

| Si Infiltration | |
|---|---|
| Density (g/cc) | 3.00 |
| Calculated SiC Content (vol. %) | 76 |
| Young's Modulus (GPa) | 353 |
| Knoop 500 g Hardness (kg/mm²) | 1623 ± 334 |
| Knoop 2 kg Hardness (kg/mm²) | 1197 ± 244 |
| Si—15Ti Infiltration | |
| Density (g/cc) | 3.10 |
| Young's Modulus (GPa) | 369 |
| Knoop 500 g Hardness (kg/mm²) | 1436 ± 336 |
| Knoop 2 kg Hardness (kg/mm²) | 1199 ± 122 |
| Si—40Ti Infiltration | |
| Density (g/cc) | 3.24 |
| Young's Modulus (GPa) | 395 |
| Knoop 500 g Hardness (kg/mm²) | 1549 ± 249 |
| Knoop 2 kg Hardness (kg/mm²) | 1339 ± 77 |

Compositional results by x-ray diffraction are provided in Table 3.

TABLE 3

X-Ray Diffraction (XRD) Results for Experimental Reaction Bonded SiC Tiles
(Testing by Analytical Services, Inc., Allentown, NJ)

| Infiltration Alloy | Wt. % by Quantitative XRD | | | | |
|---|---|---|---|---|---|
| | SiC | Si | $TiSi_2$ | TiC | Other |
| Si | 85.1 | 13.4 | 0 | 0 | 1.6 |
| Si—15Ti | 83.5 | 10.0 | 4.1 | 0 | 1.9 |
| Si—40Ti | 84.6 | 4.4 | 10.2 | 0 | 0.7 |

The addition of Ti is yielding the desired response of the formation of titanium silicide at the expense of Si (Table 3). This substitution leads to higher stiffness (elastic modulus), as shown in Table 2.

One major drawback of processing reaction bonded SiC components is the fact that Si expands upon freezing. Thus, after processing, adhered excess Si exists on the surface of the parts, and must be removed (e.g., by grit blasting). Moreover, if a part has complex geometry (e.g., internal channels), these features will fill with Si as it expands during cooling from the processing temperature. Removal of excess Si from complex features, such as deep holes, pockets or channels, is very difficult.

Figure 5:
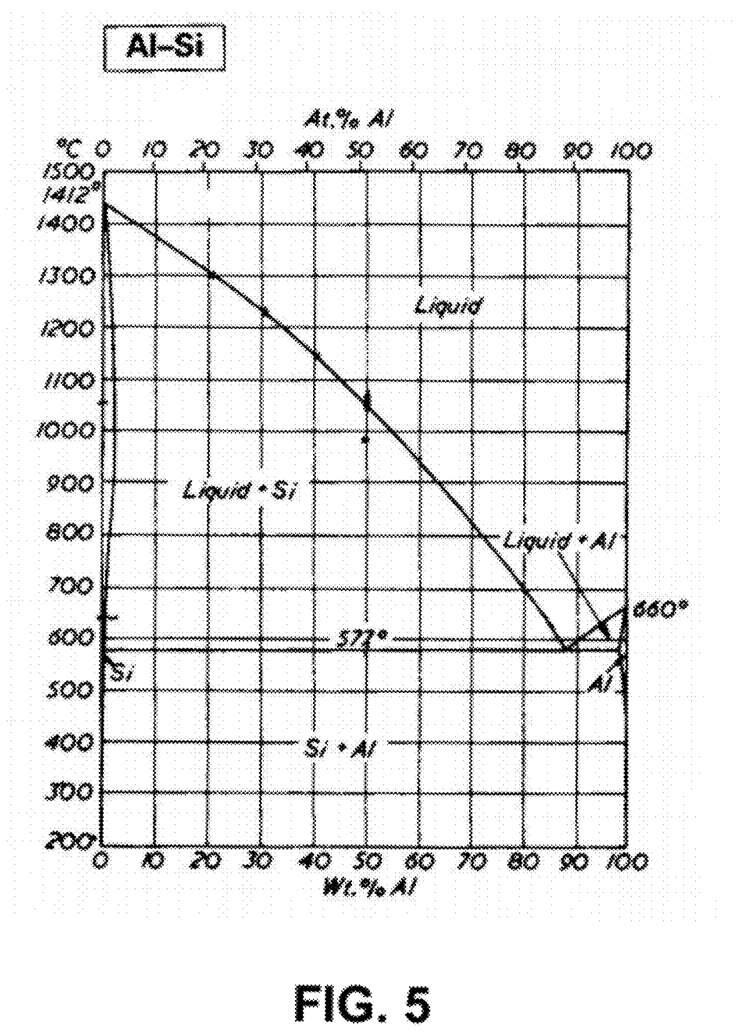
FIG. 5 is the Al—Si phase diagram.

One method to minimize the problem is to reduce the amount of Si in the microstructure. Then, there is less material that will expand upon freezing. This can be accomplished by alloying the Si with another metal, such that upon freezing the expansion of Si is balanced by the contraction of the other metal. This concept was disclosed by the assignee of the present invention in the past for Al—Si alloys. However, a disadvantage of this system is the wide freezing range for Al—Si alloys (FIG. 5). Upon cooling, Si freezes first (at high temperatures) and expands. Then, at a much lower temperature, the Al—Si eutectic will freeze and contract. The high temperature freezing and expansion of the Si causes internal channels to be filled and the low temperature freezing and contraction of the Al—Si eutectic causes solidification porosity to form. Another problem with the Al—Si systems is that Al will be left in the final structure. Al is not desired for applications where high stiffness, high temperature strength, corrosion resistance, and/or high hardness are required. Use of the Ti—Si alloys, discussed above, is much more effective due to the small freezing range (FIG. 1). Since all phases are freezing at nearly the same temperature, issues with expansion and contraction are very much mitigated. Moreover, the final composite will contain one or more titanium silicide intermetallics, which have good properties.

Figure 6:
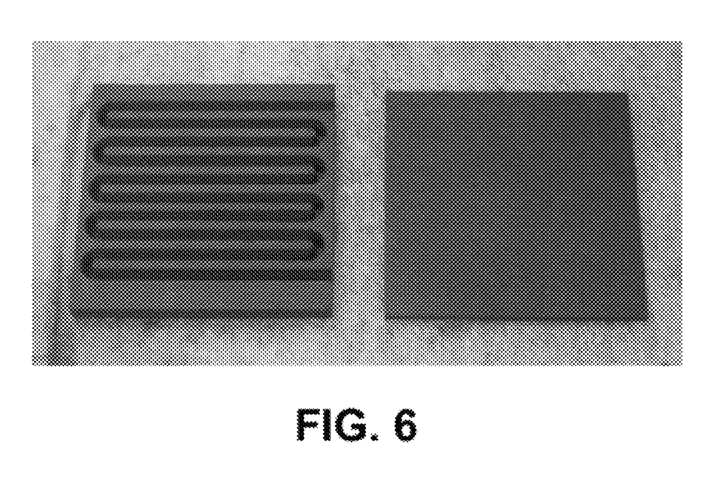
FIG. 6 is a photograph of green machined preforms—ribbed body and cover.

To assess the ability to produce a complex-shaped reaction bonded SiC component using the Ti—Si alloy approach, the following steps were conducted:
Produced ribbed preform and cover—standard formulation (FIG. 6)
Bonded preforms using SiC powder and epoxy glue
Infiltrated with Si-40Ti alloy at 1520° C.
Diced infiltrated part to show interior (FIG. 7)
Mounted and polished cross-section to show bond line (FIG. 8)

The "standard formulation" refers to the preform composition and processing of Example I. The adhesive to bond the preforms to one another was prepared as follows: The bonding adhesive comprised by weight about 68 percent CRYSTOLON green silicon carbide particulate (St. Gobain/Norton Industrial Ceramics) and the balance being the Ciba 8603 ResinFusion™ epoxy system (Ciba Specialty Chemicals Corp., East Lansing, Mich.) consisting by weight of about 15 parts hardener to 100 parts resin. The silicon carbide particulate featured the same grades and proportions as was used to prepare the preform subunits. This mixture was prepared simply by adding all of the constituents to a plastic beaker and stirring by hand until the mixture was uniform. The bonding surfaces were coated with the adhesive mixture, and the halves of the preform were brought together under light pressure. The assembled preform assembly was then set aside overnight to cure the epoxy component of the adhesive.

Figure 7:
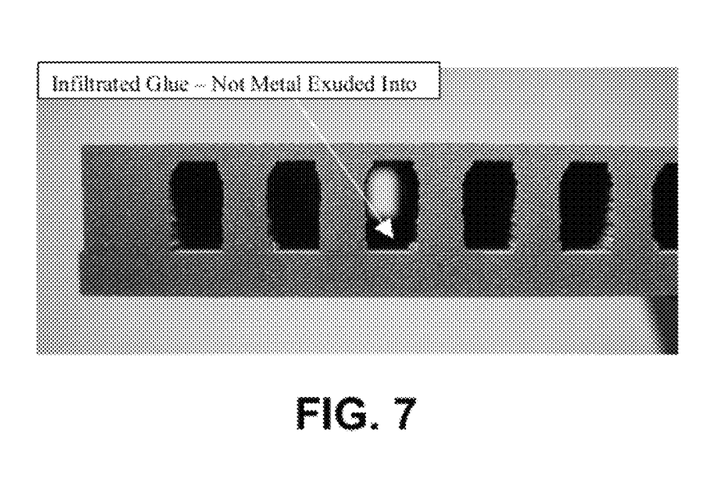
FIG. 7 is a photograph of a preform infiltrated with Si-40Ti alloy and sectioned to reveal a clean interior.
Figure 8:
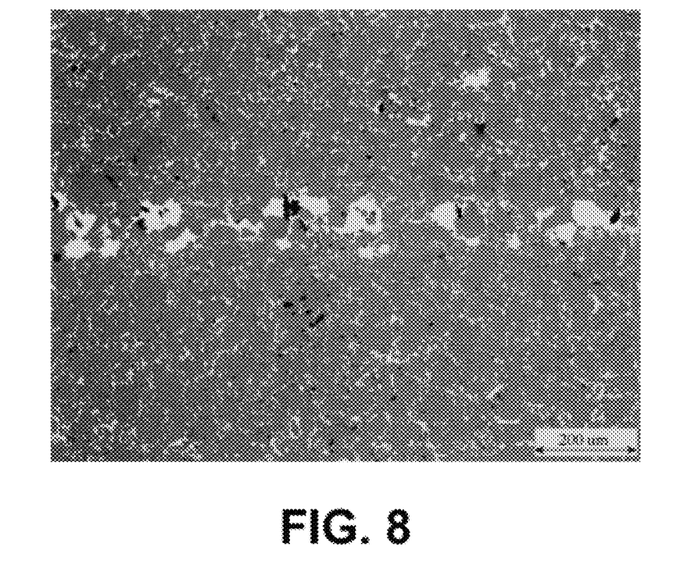
FIG. 8 is an optical photomicrograph of the bond line of the infiltrated preform of FIG. 7.

Based on FIG. 7, the bonded preform assembly infiltrated completely with no excess metal entering the internal cavities. Based on FIG. 8, the bond line is well infiltrated and tight. A small level of porosity can be seen in FIG. 8, which can be reduced by adding carbon to the preform (less second phase) and/or optimizing the Ti—Si ratio in the infiltration alloy.

Thus, this Example demonstrates that composites containing silicides of titanium can be produced by a reaction infiltration technique, and that the resulting composite material can be fabricated into industrially useful articles of complex shape.

Industrial Applicability

The methods and compositions of the present invention will find utility in applications requiring complex shapes, machining at an intermediate stage of development, high dimensional accuracy and precision, high specific stiffness, low thermal expansion coefficient, high hardness, improved toughness and/or high wear resistance. Accordingly, the silicide intermetallic-containing composite materials of the present invention are of interest in the precision equipment, robotics, tooling, armor, automotive, electronic packaging and thermal management, and semiconductor fabrication industries, among others. The present silicide-containing composite materials are candidate materials for wear critical components. Specific articles of manufacture contemplated by the present invention include body and vehicle armor, semiconductor wafer handling devices, vacuum chucks, electrostatic chucks, air bearing housings or support frames, electronic packages and substrates, machine tool bridges and bases, mirror substrates, mirror stages and flat panel display setters.

An artisan of ordinary skill will readily appreciate that various modifications may be made to what has been described herein without departing either from the scope or spirit of the present invention, and that what is intended to be covered by patent law is set forth in the claims appended hereto, and in appropriate equivalents thereof.

The invention claimed is:

1. A method for making a composite material, comprising:
providing a porous mass comprising at least one reinforcement material, wherein said porous mass contains no infiltration-facilitating carbon;
providing an infiltrant material comprising silicon and at least one metal comprising titanium;
heating said infiltrant material to a temperature above the liquidus temperature of said infiltrant material to form a molten infiltrant material;
communicating said molten infiltrant material into contact with said porous mass;
infiltrating said molten infiltrant material into said porous mass and reacting at least a portion of said titanium with at least a portion of said silicon to form a composite body comprising said at least one reinforcement material, and at least one titanium-silicon intermetallic compound distributed through said at least one reinforcement material, said titanium-silicon intermetallic compound being at least partially interconnected; and
solidifying said molten infiltrant material.

2. The method of claim 1, wherein said infiltrating is conducted in a non-oxidizing environment.

3. The method of claim 1, wherein said infiltrant material comprises at least 10 percent by weight of said titanium.

4. The method of claim 1, wherein said at least one reinforcement material comprises a substance selected from the group consisting of carbides, borides, nitrides and oxides.

5. The method of claim 1, wherein said reinforcement material comprises bodies ranging in size from submicron to about 5 millimeters.

6. The method of claim 1, wherein said reinforcement material comprises a plurality of individual bodies.

7. The method of claim 1, wherein said at least one reinforcement material has a morphology selected from the group consisting of particulates, fibers, platelets, flakes, and reticulated structures.

8. The method of claim 1, wherein said porous mass comprises by volume from about 10 percent to about 85 percent of said reinforcement material.

9. The method of claim 1, wherein said reinforcement material comprises at least one substance selected from the group consisting of SiC, $B_4C$, TiC, WC, $Si_3N_4$, TiN, AlN, $SiB_4$, $TiB_2$, $AlB_2$, $Al_2O_3$ and MgO.

10. The method of claim 1, wherein said composite body further comprises at least one of elemental titanium and elemental silicon.

11. The method of claim 1, wherein said infiltrating is conducted in vacuum.

12. The method of claim 1, wherein said infiltrant comprises at least about 15 percent by weight of titanium.

13. The method of claim 1, wherein said temperature is about 1520C.

14. The method of claim 1, wherein said titanium-silicon intermetallic compound comprises at least one of TiSi and $TiSi_2$.

15. The method of claim 1, wherein said infilttrant material further comprises dissolved boron.

16. The method of claim 15, wherein said infiltrant material further comprises dissolved carbon.

17. The method of claim 1, wherein said infiltrant material is provided as a reservoir.

18. The method of claim 1, wherein said solidifying comprises directional solidification.

* * * * *